United States Patent [19]

Hiroi

[11] Patent Number: 5,480,701
[45] Date of Patent: Jan. 2, 1996

[54] LAMIMINATE SHEET AND CARD

[75] Inventor: Junichi Hiroi, Tokyo, Japan

[73] Assignee: Dai Nippon Printing Co., Ltd., Japan

[21] Appl. No.: 357,984

[22] Filed: Dec. 19, 1994

Related U.S. Application Data

[60] Continuation of Ser. No. 111,275, Aug. 24, 1993, abandoned, which is a division of Ser. No. 769,371, Oct. 19, 1991, abandoned.

[30] Foreign Application Priority Data

Oct. 4, 1990 [JP] Japan ................... 2-265109

[51] Int. Cl.$^6$ .................... B41M 5/26; B32B 27/14
[52] U.S. Cl. ............... 428/204; 428/354; 428/355; 428/913; 428/914; 428/476.1; 428/518; 503/227
[58] Field of Search .................. 428/203, 204, 428/354, 355, 913, 914; 503/227

[56] References Cited

U.S. PATENT DOCUMENTS

| | | | |
|---|---|---|---|
| 3,627,559 | 12/1971 | Chen | 428/354 X |
| 4,522,881 | 6/1985 | Kobayashi et al. | 428/481 X |
| 4,599,259 | 7/1986 | Kobayashi et al. | 428/336 X |
| 4,759,968 | 7/1988 | Janssen | 428/354 X |
| 4,780,348 | 10/1988 | Yamamoto et al. | |
| 4,977,136 | 12/1990 | Fujiwara et al. | 428/480 X |

FOREIGN PATENT DOCUMENTS

| | | |
|---|---|---|
| 0103024 | 3/1984 | European Pat. Off. |
| 0178332 | 4/1986 | European Pat. Off. |
| 0407615 | 1/1991 | European Pat. Off. |
| 1237193 | 9/1989 | Japan |
| 90/08661 | 8/1990 | WIPO |

OTHER PUBLICATIONS

Patent Abstracts of Japan, vol. 13, No. 567 (M–908) [3915], Dec. 15, 1989.

*Primary Examiner*—George F. Lesmes
*Assistant Examiner*—Blaine R. Copenheaver
*Attorney, Agent, or Firm*—Parkhurst Wendel & Rossi

[57] ABSTRACT

A laminate sheet for protecting a thermally transferred image formed on one of surfaces of a material to be protected including a base material, a first bonding layer having one surface contacting one of surfaces of the base material and a second bonding layer having one surface contacting another surface of the first bonding layer and another surface contacting one surface of the material to be protected on which a thermally transferred image is formed. The base material including a base film having transparency to an extent through which the thermally transferred image can be observed. The first bonding layer is formed of polyethylene resin, ionomer resin, polyamide resin or polypropylene resin, and the second bonding layer is formed of polyamide resin or vinyl chloride/vinyl acetate copolymer. The laminate sheet of the structure described above is utilized for the formation of a pouch-card, a flash-card or the like.

33 Claims, 1 Drawing Sheet

LAMIMINATE SHEET AND CARD

This application is a Rule 62 Continuation Application of U.S. Ser. No. 08/111,275, filed Aug. 24, 1993, now abandoned, which in turn is a Rule 62 Divisional Application of U.S. Ser. No. 07/769,371, filed Oct. 1, 1991, now abandoned.

BACKGROUND OF THE INVENTION

The present invention relates to a laminate sheet and a card capable of imparting an improved bending-resisting property and image durability to a thermally transferred image.

In the conventional technology, various printed letters or the like and images have been widely formed by thermal transfer methods.

These thermal transfer methods are approximately classified into two types, one being a so-called wax-type (heat-fusion type) in which a thermal transfer layer is softened by heating and thermally transferred to a material on which an image is being transferred and the other being a so-called sublimation type in which a dye in a thermal transferred layer is sublimated (heat transfer) and only the dye is thermally transferred to a material on which an image is being transferred.

In both types, a print image to be formed is merely caused to adhere or dyed on the surface of a thermal transfer image sheet, so that the image durability such as anti-friction property and an anti-solvent property of the print image is inferior, and when the image sheet contacts another article, colors of the transfer sheet may be transferred, thus damaging the surface of the article.

In order to solve such problems, the prior art further provides a transfer method in which a transparent sheet provided with a bonding layer is preliminarily laminated on the image surface of the print image to be thermally transferred, for example, as disclosed in Japanese Patent Laid-Open Specification No. 1-237193.

However, in the case where such laminate sheet of conventional art is applied to cards such as identification cards and the like which are required to be prevented from being counterfeited or falsified by forcibly peeling of the laminate sheet, there is a possibility of the laminate sheet being peeled off without damaging the transferred image on the card, and it becomes possible to falsify or deform the card. Accordingly, in order to obviate such possibility, it is necessary to strongly bond the laminate sheet to the card to the extent that the transferred image will be damaged if the laminate sheet is forcibly peeled off.

Furthermore, since such cards are usually subjected to severe and repeated handling, it is also necessary for such cards to have improved flexibility and bending-resisting property. However, in the conventional laminate sheet card, there is a possibility of the bonded layer being locally peeled off with repeated use in a bent manner, and an opaque portion may be formed in the card, resulting in the degradation of image on the card. These problems are conspicuous in pouch-cards in which the laminate sheet covers the peripheral portion of the card as well as both sides of the image, and an overlap width portion is also bonded thereby to entirely wrap the image and a flash-cut type card in which the overlap width portion of the pouch-card is cut.

Still further, in the case where an image to be protected on the card is of a sublimation transfer type image, it is necessary to prevent bleeding of the dye image due to the formation of the bonding layer.

SUMMARY OF THE INVENTION

Accordingly, an object of the present invention is to substantially eliminate the defects or drawbacks encountered in the prior art technology described above and to provide a laminate sheet and a card capable of imparting, to a thermally transferred image, superior bonding strength, bending-resisting property, image durability and the like.

This and other objects can be achieved according to the present invention by providing a laminate sheet for protecting a thermally transferred image formed on one of the surfaces of a material to be protected comprising a base material, a first bonding layer having one surface contacting one of the surfaces of the base material and a second bonding layer having one surface contacting another surface of the first bonding layer and another surface contacting one surface of the material to be protected on which a thermally transferred image is formed.

In a preferred embodiment, the first bonding layer is formed of one of polyethylene resin, ionomer resin, polyamide resin and polypropylene resin, and the second bonding layer is formed of one of polyamide resin and vinyl chloride/vinyl acetate copolymer.

A pouch-card and a flash-card may be prepared by utilizing the laminate sheet of the structure described above.

According to the laminate sheet and the card of the present invention of the structure described above, the bonding layer is constructed as a two-layer structure including the first and second bonding layers. The first bonding layer contacting the base sheet has a relatively thick thickness for imparting a cushioning property, and the second bonding layer contacting the thermally transferred image has a relatively thin thickness having a high bonding strength, whereby superior bonding strength, bending-resisting property and image durability can be imparted to the thermally transferred image formed on the sheet material.

BRIEF DESCRIPTION OF THE DRAWINGS

For a better understanding of the present invention and to show how the same is carried out, reference is first made, by way of preferred embodiments, to the accompanying drawings, in which.

DESCRIPTION OF THE PREFERRED EMBODIMENTS

Figure 1:
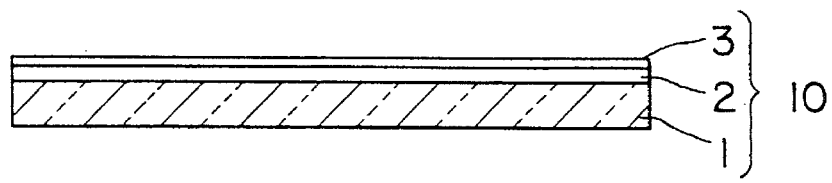
FIG. 1 is an illustrated sectional view of a laminate sheet according to the present invention.

FIG. 1 is a sectional view of a laminate sheet 10 of one example according to the present invention, in which a first bonding layer 2 is laminated on a transparent base film 1, and a second bonding layer 3 is further laminated on the first bonding layer 2. Although it may be said that the first and second layers 2 and 3 should be referred to as bonding layers before bonding and as bonded layers after bonding, these layers 2 and 3 are referred to as bonding layers 2 and 3 herein for avoiding confusion.

For the transparent sheet 1 as the base of the laminated sheet of this example, it is minimally necessary to have a transparency to the extent that a thermally transferred image as a ground is visual through the transparent sheet 1, and accordingly, in this meaning, it may be possible to effect a coloring or frosting treatment. Actually, a colored or uncolored transparent or translucent sheet or film formed of a material such as polyethylene, polypropylene, polyvinylidene chloride, polyvinyl alcohol, polyester, polycarbonate, polyamide, polystyrene, ethylene/vinyl acetate copolymer, ethylene/vinyl alcohol copolymer, or ionomer may be utilized. In the case where mechanical strength, transparency, bending property, heat resisting property and the like are specifically considered, the use of polyester, polycarbonate or polyamide film may be preferred, and more particularly, the use of polyethylene terephthalate and polyethylene naphthalate may be more preferable. It is of course possible to preliminarily add such additives as an ultraviolet-ray absorbent, antioxidant, light-stabilizer and the like. It is also desired that the sheet or film have a thickness of ordinarily 25 to 200 μm or preferably 75 to 125 μm.

For the first bonding layer 2, it is required to have characteristics or properties for increasing strong adhesion to the image surface at the time of bonding, for being softened at the time of heat lamination for acquiring adhesive property to the image to be protected, and for acquiring mechanical strength and cushioning property against tearing and pulling. As a resin for acquiring such characteristics or properties, a resin having a high molecular weight is desired. Moreover, because it is necessary for the first bonding layer to be relatively thick, it is further desirable to use a resin material capable of being worked in the absence of a solvent, for example, capable of being subjected to a coating based on fusion-extrusion and coextrusion working at the time of forming the transparent base material. As resin materials having such properties, colored or uncolored transparent or translucent polyethylene, polypropylene, polyamide, ionomer, polycarbonate, ABS resin, AS resin, MBS resin, polyester, polystyrene, and polybutylene can be used. Of these, polyethylene, ionomer, polyamide or polypropylene resin are preferable.

It is desirable that the first bonding layer 2 have a thickness of 5 to 70%, preferably 5 to 50%, of the thickness of the base film. The first bonding layer 2 is formed in the absence of a solvent but formed by a known coating method utilizing a solvent such as a roll coating, die coating, knife coating or gravure coating method.

For the second bonding layer 3, a thickness of 1 to 50%, preferably 4 to 40%, of the total thickness of the bonding layers is desirable. Specifically, a thickness of 15 to 25 μm is desirable for the second bonding layer 3.

Furthermore, it is desirable for the second bonding layer 3 to have a solid slipping agent and a filler formed of a material such as microsilica, talc, clay, calcium carbonate, barium sulfate or fluororesin powder in an amount which will not damage the transparency for preventing blocking during manufacturing and storing, and for preventing air bubbles from being entrapped at the time of bonding the second layer 3 to the image surface. For example, it is desirable to add such solid slipping agent or filler in a quantity of 0.01 to 20 weight parts with respect to 100 weight parts of resin.

In the above example, it is desirable that the total thickness of the first and second bonding layers 2 and 3 be 10 to 50% with respect to the total thickness of the laminated sheet 10, and more specifically, that the thickness be about 3.5 to 90 μm.

According to the present invention, an object to which the laminate sheet 10 is applied is not specifically limited. It can be applied to a sublimation type transferred image, a heat-fusion type transferred image, or a combination image of these types, or images formed by other methods.

Figure 2:
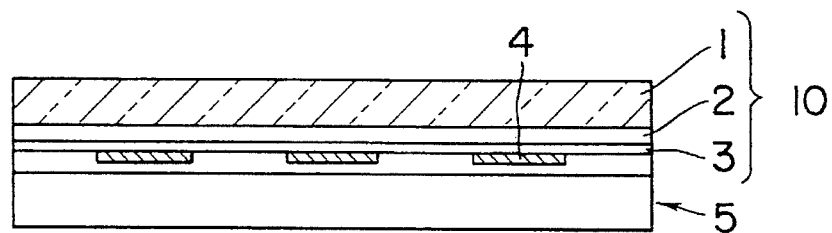
FIGS. 2 to 4 are also illustrated sectional views of examples of a card according to the present invention.

FIG. 2 shows one example of a card which is formed by utilizing the laminate sheet 10 of the character described above. In an actual formation, the card of FIG. 2 is formed by laminating the laminate sheet 10 to an image surface of a thermal transfer image sheet 5, on which a thermally transferred image 4 (print image) is formed, through the first and second bonding layers 2 and 3. According to the card prepared by such a method, not only can the durability to the print image 4 be improved, but also the first bonding layer 2 can attain a sufficient cushioning property when the card is bent, thereby preventing the bonding layers and the image surface from being separated as well as generation of white turbidity and folded lines. Moreover, the bonding strength between the image surface and the bonded layer is increased by the synergism of the bonding layers 2 and 3. The print image 4 is damaged when an attempt is made to forcibly peel off the laminate sheet 10, thus preventing falsification and deformation of the image.

Figure 3:
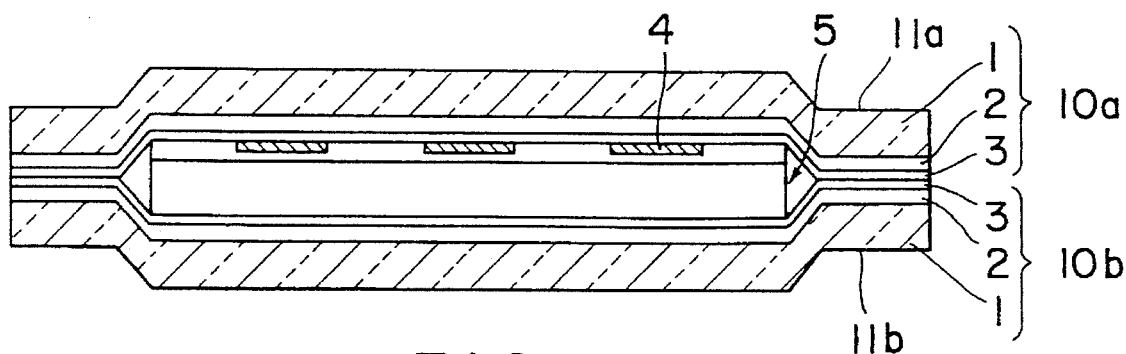

FIG. 3 shows a sectional view of another example of a card according to the present invention. In this illustrated example, a first laminate sheet 10a is bonded to an image surface, on which a thermally transferred image is formed. A thermal transfer sheet 5 and a second laminate sheet 10b are bonded to the other surface thereof. These first and second laminate sheets 10a and 10b each have substantially the same structure as that of the laminate sheet 10 of the aforedescribed example. Furthermore, these laminate sheets 10a and 10b are extended outward from the thermal transfer sheet 5, and the second bonding layers 3 and 3 of both the laminate sheets 10a and 10b are bonded to each other at the outward portions of the thermal transfer sheet 5 as shown in FIG. 3 to thereby envelop the same within the laminate sheets 10a and 10b, thus forming a pouch-card. The thus formed pouch-card is particularly preferred for a card used under severe and repeated bending conditions. That is, although a large stress is applied, by repeated bending handling, to the image surface and the outer portions 11a and 11b (overlapped portion) of the thermal transfer sheet 5 formed of the first and second laminate sheets 10a and 10b, the stress can be absorbed by the cushioning property of the first bonding layers 2 and 2, thus preventing the overlapped portions 11a and 11b from being peeled off.

Figure 4:
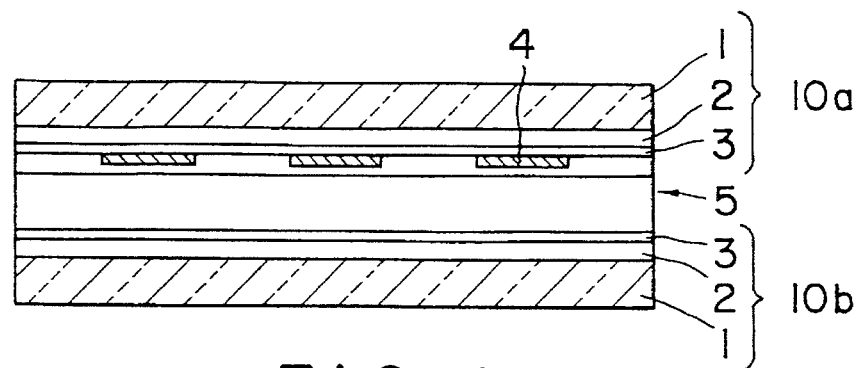

FIG. 4 shows a further example of a card according to the present invention. In this example, the card is formed as a flash-cut type card by cutting the overlapped portions 11a and 11b of the thermal transfer sheet 5 formed of the first and second laminate sheets 10a and 10b shown in FIG. 3. In this example, the first and second laminate sheets 10a and 10b can be prevented from being peeled off at the cut portions.

In the foregoing disclosure, the present invention is described by way of preferred examples, but the laminate sheet may be further applied to various cards and the like useful for lamination to various thermally transferred images, such as student certification cards, employee cards, certification cards for government and municipal officers, membership cards, or other cards for certifying nationalities, addresses, dates of birth, firm names, government offices, responsibilities, and various rights, which are per se known. It is of course possible to utilize these laminate sheets for various printing materials requiring high durability other than the certificate cards of the types described above.

The laminate sheets of the present invention will be described in further detail hereunder with reference to specific examples and comparative examples.

EXAMPLES 1 TO 7

In Examples 1 to 3, 6 and 7, a polyethyleneterephthalate film having a thickness of 100 μm was utilized as a base film, and in Examples 4 and 5, a polyethylene-terephthalate film having a surface subjected to a mild adhesion treatment and having a thickness of 125 μm was utilized as a base film.

of 4 sec. The following Table 1 shows the structures of the thus obtained laminate sheets and evaluations of the results.

TABLE 1

|  | Thickness of Base | First Bonding Layer | Second Bonding Layer | Surface Treatment | Bending | Forcible Peeling | Retention of Heat Resistance |
| --- | --- | --- | --- | --- | --- | --- | --- |
| Example 1 | 100 μm | Polyethylene 25 μm | Polyamide 5 μm | not treated | O | Δ~O | 4 |
| Example 2 | 100 μm | Polyethylene 25 μm | Polyamide 5 μm | Corona Discharge | O | Δ~O | 4 |
| Example 3 | 100 μm | Ionomer 25 μm | Polyamide 5 μm | Corona Discharge | O | O | 4 |
| Example 4 | 125 μm | Ionomer 25 μm | Polyamide 5 μm | Corona Discharge | O | O | 4 |
| Example 5 | 125 μm | Ionomer 50 μm | Polyamide 5 μm | Corona Discharge | O | O | 4 |
| Example 6 | 100 μm | Ionomer 50 μm | Polyamide 5 μm | not treated | O | O | 4 |
| Example 7 | 100 μm | Ionomer 50 μm | Polyamide 5 μm | Corona Discharge | O | O | 4 |
| Comparative Example 1 | 188 μm | — | Polyamide 5 μm | — | Δ | X | 5 |
| Comparative Example 2 | 150 μm Total Thickness | — | — | — | Δ | X | 2 |

In the thus prepared laminate sheets, in Examples 1 and 2, the first bonding layers were formed of a polyethylene resin and in Examples 3 to 7, the first bonding layers were formed of an ionomer resin (Hymilan 1652 manufactured by MITSUI Dupont Chemical K.K.) by an extrusion coating method. The surfaces of the first bonding layers of Examples 2 to 5 and 7 were subjected to a corona discharge treatment.

In the next step, with respect to all of the examples, a solution of a polyamide resin (FS-175 manufactured by TOA GOSEI KAGAKU KOGYO K.K.) applied as a coating by using a wire bar #30 so as to provide a coating having a thickness of 5 μm, which was then dryed. Thereafter, the thus obtained sheet materials were kept in an oven at a temperature of 80° C. for forming the second bonding layers, thus preparing laminate sheets according to the present invention.

COMPARATIVE EXAMPLE 1

In this example, a bonding layer having a thickness of 5 μm and formed of the polyamide resin utilized in the examples of the present invention was applied directly on the base film.

COMPARATIVE EXAMPLE 2

A commercially sold laminate film manufactured by MEIKO SHOKAI K.K. was utilized.

For the comparison, pouch-cards were prepared by utilizing the laminate sheets formed in accordance with Examples 1 to 7 according to the present invention and the Comparative Examples 1 and 2 in a manner such that the thus prepared laminate sheets were overlapped on both surfaces of image receiving papers on which sublimation transfer images were formed, and the bonded surfaces of the overlapped sheets were heated to 105° C. for a heating time With reference to the above Table 1:
Bending:
Bending test carried out by hand after lamination Bent twenty times widthwise and lengthwise directions, respectively, and examined for extents of peeling.
O—Not peeled.
Δ—Partially peeled.
×—Completely peeled.
Peeling Strength:
Peeling condition in the case where bonded surfaces at overlapped portions were forcibly peeled was examined.
O—Base was broken.
Δ—Peeling resistance was high, but peeling was observed at the bonded surfaces.
×—Easily peeled at the bonded surface.
Retention of Heat Resistance:
Bleedings of images were visually observed at five evaluation stages after preservation for 72 hours at 60° C.
5: No bleeding; 1: severely bleeding (2 to 4 intermediate)
As can be understood from the above Table 1, in the example in which the bonding layer is of two-layer structure and the total thickness of the layers is 5 to 70% of the sheet thickness, the bonding strength was high, and in case of the utilization of the polyamide resin as the second bonding layer, less bleeding was observed, thus being advantageous.

EXAMPLES 8 TO 13 AND COMPARATIVE EXAMPLE 3

A polyethylene-terephthalate film which is easily subjected to a bonding treatment and has a thickness of 100 μm was prepared as the base film, and the first bonding layer was formed of ionomer resin (Hymiran 1652) by the extrusion coating method to a thickness of 50 μm.

In all examples, a polyamide resin solution (FS-175) to which fillers of the following Table 2 were added was coated by utilizing a wire bar #30 to a coated film thickness of 5 μm, which was then dryed and kept for ten minutes in an oven at a temperature of 80° C. to thereby form the second bonding layer, thus preparing the laminate sheets of the examples according to the present invention and the comparative example.

With reference to the laminate sheets thus prepared, haze values (JIS K6714, ASTM D1003-61) were measured and blocking tests were carried out. For comparison, pouch-cards were prepared by utilizing the laminate sheets formed in accordance with Examples 8 to 13 of the present invention and the Comparative Example 3 in a manner such that the thus prepared laminate sheets were overlapped on both surfaces of image receiving papers on which sublimation transfer images were formed. The bonding surfaces of the overlapped sheets were heated to 105° C. for a heating time of 4 sec. The following Table 2 shows the evaluation results of the thus obtained laminate structures.

TABLE 2

|  | Filler | Added Amount (wt %) | Haze (wt %) | Bending Tests | Blocking Tests |
| --- | --- | --- | --- | --- | --- |
| Example 8 | Aerosil R972 | 16.7 | 27.6 | O | O |
| Example 9 | Aerosil R972 | 9.1 | 14.1 | O | O |
| Example 10 | Aerosil R972 | 2.4 | 14.5 | O | O |
| Example 11 | OK412 | 23.1 | 84.4 | X | O |
| Example 12 | OK412 | 9.1 | 73.1 | O | O |
| Example 13 | OK412 | 4.8 | 46.4 | O | O |
| Comparative Example 3 | — | — | 14.1 | O | X |

Blocking Tests:
Load of 1.5 Kg/cm² was applied under steady state, kept for 72 hours, and bonded conditions were observed.
O — absence of blocking
X — presence of blocking Blocking Tests:
Load of 1.5 Kg/cm² was applied under steady state, kept for 72 hours, and bonded conditions were observed.
O—absence of blocking
x—presence of blocking

EXAMPLES 14 TO 17

A polyethylene-terephthalate film which was easily subjected to a bonding treatment and had a thickness of 100 μm was prepared as the base film. The first bonding layer was formed of ionomer resin (Hymiran 1652) by the extrusion coating method to a thickness of 50 μm.

In all examples, a polyamide resin solution (FS-175) was applied as a coating by utilizing a wire bar #30 to a coated film thickness of 5 μm, which was then dryed and kept for 10 minutes in an oven at temperature of 80° C. to thereby form the second bonding layer, thus preparing the laminate sheet A of the examples according to the present invention.

Likewise, a vinyl chloride/vinyl acetate copolymer resin solution (BLS-4266, manufactured by TOYO MORTON K.K.) was applied as a coating on a base film provided with an ionomer layer by utilizing a wire bar #20 so as to form a coating film of a thickness of 5 μm, which was then dryed, thus preparing a laminate sheet B.

Flash-cards were prepared by utilizing such two laminate sheets A and B in a manner such that dye receiving layers were provided on the surfaces of plastic films, and these laminate sheets were overlapped to both surfaces of image receiving papers on which sublimation transfer images were formed. Thereafter, the laminating treatments were carried out with a heating temperature of 105° C. for a heating time of 4 sec. The following Table 3 shows the structures of the respective laminations and the evaluation results of the thus obtained laminate structures.

TABLE 3

|  | Laminate Sheet | | Bending | | Peeling Strength | |
| --- | --- | --- | --- | --- | --- | --- |
|  | Front Surface | Rear Surface | Front Surface | Rear Surface | Front Surface | Rear Surface |
| Example 14 | Laminate Sheet A | Laminate Sheet A | O | O | O | X |
| Example 15 | Laminate Sheet A | Laminate Sheet B | O | O | O | O |
| Example 16 | Laminate Sheet B | Laminate Sheet A | O | O | Δ-O | X |
| Example 17 | Laminate Sheet B | Laminate Sheet B | O | O | Δ-O | O |

As shown in the above Table 3, in the case where the laminate sheets are laminated on both surfaces of the image, it will be found that it is desirable to select the second bonding layer in accordance with the characteristics of the surfaces to be bonded.

As described above, according to the present invention, a laminate sheet having a bonding strength superior to that of the thermally transferred image and having a bending-resisting property against repeated bending and an improved image durability can be provided by constructing the bonding layer as a two-layer structure in which the first bonding layer contacting the sheet is made thicker so as to have a cushioning property, and the second bonding layer contacting the image surface is made thinner to have a high bonding strength.

What is claimed is:

1. A laminated structure comprising:

a sheet material having a surface in which a thermally transferred image is formed; and a laminate sheet comprising (i) a base sheet having a first major surface and an opposed, second major surface; (ii) a first bonding layer laminated on said first major surface of said base sheet, said first bonding layer comprising ionomer resin; and (iii) a second bonding layer laminated on said first bonding layer, said second bonding layer comprising at least one resin selected from the group consisting of polyamide resin and vinyl chloride/vinyl acetate copolymer resin;

wherein said laminate sheet is bonded to said surface of said sheet material through direct contact with said second bonding layer.

2. A laminated structure according to claim 1, wherein said base sheet has a thickness of 25 to 200 μm.

3. A laminated structure according to claim 1, wherein said first bonding layer has a thickness of 5 to 70% of that of said base sheet.

4. A laminated structure according to claim 1, wherein said second bonding layer has a thickness of 1 to 50% of the total thickness of the first and second bonding layers.

5. A laminated structure according to claim 1, wherein the total thickness of said first and second bonding layers is 10 to 50% of that of said laminate sheet.

6. A laminated structure according to claim 1, wherein the total thickness of said first and second bonding layers is 3.5 to 90 μm.

7. A laminated structure according to claim 1, wherein said base sheet comprises an additive selected from the group consisting of an ultraviolet-ray absorbent, an antioxidant, and a light stabilizer.

8. A laminated structure according to claim 1, wherein said second bonding layer comprises a solid slipping agent and filler.

9. A laminated structure according to claim 8, wherein said filler comprises at least one material selected from the group consisting of microsilica, talc, clay, calcium carbonate, barium sulfate and fluororesin powder.

10. A laminated structure according to claim 1, wherein said first bonding layer is provided by fusion extrusion.

11. A laminated structure comprising:

a sheet material in which a thermally transferred image is formed on at least one of first and second opposed surfaces thereof; and first and second laminate sheets each comprising (i) a base film having a first major surface and an opposed, second major surface; (ii) a first bonding layer laminated on said first major surface of said base film, said first bonding layer comprising ionomer resin; and (iii) a second bonding layer laminated on said first bonding layer, said second bonding layer comprising at least one resin selected from the group consisting of polyamide resin and vinyl chloride/vinyl acetate copolymer resin, said second bonding layer further comprising at least one material selected from the group consisting of a solid slipping agent in a quantity of 0.01 to 20 parts by weight per 100 parts by weight of the remaining components of said second bonding layer, and a filler in a quantity of 0.01 to 20 parts by weight per 100 parts by weight of the remaining components of said second bonding layer;

wherein each of said first and second laminate sheets is bonded to respective surfaces of said sheet material through direct contact with said second bonding layer of each laminate sheet.

12. A laminated structure according to claim 11, wherein said first and second laminate sheets extend outward from both ends of said sheet material, and second bonding layers of said first and second laminate sheets are bonded together at the extended ends thereof.

13. A laminated structure according to claim 11, wherein the card is a pouch-card.

14. A laminated structure according to claim 12, wherein the card is a flash-card formed by cutting off the extended portions of said first and second laminate sheets.

15. A laminated structure according to claim 11, wherein said base film has a thickness of 25 to 200 μm.

16. A laminated structure according to claim 11, wherein said first bonding layer has a thickness of 5 to 70% of that of said base film.

17. A laminated structure according to claim 11, wherein said second bonding layer has a thickness of 1 to 50% of the total thickness of the first and second bonding layers.

18. A laminated structure according to claim 11, wherein the total thickness of said first and second bonding layers is 10 to 50% of that of each laminate sheet.

19. A laminated structure according to claim 11, wherein the total thickness of said first and second bonding layers is 3.5 to 90 μm.

20. A laminated structure according to claim 11, wherein said base film comprises an additive selected from the group consisting of an ultraviolet-ray absorbent, an antioxidant, and a light stabilizer.

21. A laminated structure according to claim 11, wherein said second bonding layer comprises said solid slipping agent and said filler.

22. A laminated structure according to claim 21, wherein said filler comprises at least one material selected from the group consisting of microsilica, talc, clay, calcium carbonate, barium sulfate and fluororesin powder.

23. A laminated structure according to claim 11, wherein said first bonding layer is provided by fusion extrusion.

24. A laminated structure comprising:

a sheet material in which a thermally transferred image is formed on at least one of first and second opposed surfaces thereof; and first and second laminate sheets each comprising (i) a base film having a first major surface and an opposed, second major surface; (ii) a first bonding layer laminated on said first major surface of said base film, said first bonding layer comprising ionomer resin; and (iii) a second bonding layer laminated on said first bonding layer, said second bonding layer comprising at least one resin selected from the group consisting of polyamide resin and vinyl chloride/vinyl acetate copolymer resin.

25. A laminated structure according to claim 24, wherein said base film has a thickness of 25 to 200 μm.

26. A laminated structure according to claim 24, wherein said first bonding layer has a thickness of 5 to 70% of that of said base film.

27. A laminated structure according to claim 24, wherein said second bonding layer has a thickness of 1 to 50% of the total thickness of the first and second bonding layers.

28. A laminated structure according to claim 24, wherein the total thickness of said first and second bonding layers is 10 to 50% of that of each laminate sheet.

29. A laminated structure according to claim 24, wherein the total thickness of said first and second bonding layers is 3.5 to 90 μm.

30. A laminated structure according to claim 24, wherein said base film comprises an additive selected from the group consisting of an ultraviolet-ray absorbent, an antioxidant, and a light stabilizer.

31. A laminated structure according to claim 24, wherein said second bonding layer comprises a solid slipping agent and filler.

32. A laminated structure according to claim 31, wherein said filler comprises at least one material selected from the Group consisting of microsilica, talc, clay, calcium carbonate, barium sulfate and fluororesin powder.

33. A laminated structure according to claim 24, wherein said first bonding layer is provided by fusion extrusion.

* * * * *